(12) United States Patent
Kaplan et al.

(10) Patent No.: US 10,127,109 B2
(45) Date of Patent: Nov. 13, 2018

(54) RESILIENCY TO MEMORY FAILURES IN COMPUTER SYSTEMS

(71) Applicant: Cray Inc., Seattle, WA (US)

(72) Inventors: Laurence S. Kaplan, Shoreline, WA (US); Preston Pengra Briggs, III, Seattle, WA (US); Miles Arthur Ohlrich, Seattle, WA (US); Willard Huston Leslie, Issaquah, WA (US)

(73) Assignee: Cray, Inc., Seattle, WA (US)

( * ) Notice: Subject to any disclaimer, the term of this patent is extended or adjusted under 35 U.S.C. 154(b) by 0 days.

(21) Appl. No.: 15/625,985

(22) Filed: Jun. 16, 2017

(65) Prior Publication Data

US 2017/0308430 A1 Oct. 26, 2017

Related U.S. Application Data

(63) Continuation of application No. 15/357,448, filed on Nov. 21, 2016, now Pat. No. 9,910,731, which is a
(Continued)

(51) Int. Cl.
*G06F 11/10* (2006.01)
*G06F 3/06* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
CPC .. G06F 11/0772; G06F 11/08; G06F 11/1004; G06F 11/1008; G06F 11/1016;
(Continued)

(56) References Cited

U.S. PATENT DOCUMENTS 8,341,496 B2  12/2012  Mesonzhnik et al.
8,645,791 B2   2/2014  Lee et al.
(Continued)

OTHER PUBLICATIONS

Balasubramanian, V.; Banerjee, P., "Compiler-assisted synthesis of algorithm-based checking in multiprocessors," Computers, IEEE Transactions on , vol. 39, No. 4, pp. 436,446, Apr. 1990.
(Continued)

*Primary Examiner* — Christian M Dorman
(74) *Attorney, Agent, or Firm* — Perkins Coie LLP

(57) ABSTRACT

A resiliency system detects and corrects memory errors reported by a memory system of a computing system using previously stored error correction information. When a program stores data into a memory location, the resiliency system executing on the computing system generates and stores error correction information. When the program then executes a load instruction to retrieve the data from the memory location, the load instruction completes normally if there is no memory error. If, however, there is a memory error, the computing system passes control to the resiliency system (e.g., via a trap) to handle the memory error. The resiliency system retrieves the error correction information for the memory location and re-creates the data of the memory location. The resiliency system stores the data as if the load instruction had completed normally and passes control to the next instruction of the program.

17 Claims, 12 Drawing Sheets

Related U.S. Application Data continuation of application No. 13/476,819, filed on May 21, 2012, now Pat. No. 9,535,804.

(51) Int. Cl.
*G06F 11/14* (2006.01)
*G06F 11/20* (2006.01)
*G06F 11/16* (2006.01)
*G06F 11/08* (2006.01)

(52) U.S. Cl.
CPC .......... *G06F 3/0619* (2013.01); *G06F 3/0673* (2013.01); *G06F 11/1004* (2013.01); *G06F 11/1088* (2013.01); *G06F 11/141* (2013.01); *G06F 11/1662* (2013.01); *G06F 11/2023* (2013.01); *G06F 11/08* (2013.01); *G06F 11/10* (2013.01); *G06F 11/1008* (2013.01); *G06F 11/1016* (2013.01); *G06F 11/1068* (2013.01); *G06F 11/14* (2013.01); *G06F 11/1402* (2013.01); *G06F 11/1405* (2013.01); *G06F 11/1479* (2013.01); *G06F 11/202* (2013.01); *G06F 11/2035* (2013.01); *G06F 2201/805* (2013.01); *G06F 2201/82* (2013.01)

(58) Field of Classification Search
CPC ............. G06F 11/1044; G06F 11/1064; G06F 11/1068; G06F 11/1076; G06F 11/108; G06F 11/1084; G06F 11/1088; G06F 11/1092; G06F 11/1096; G06F 11/14; G06F 11/1402; G06F 11/1405; G06F 11/1407; G06F 11/141; G06F 11/1471; G06F 11/1479; G06F 11/1482; G06F 11/1484; G06F 11/20; G06F 11/2017; G06F 11/202; G06F 3/0619; G06F 3/064; G06F 3/067

See application file for complete search history.

(56) References Cited

U.S. PATENT DOCUMENTS

| | | | |
|---|---|---|---|
| 8,990,660 B2 | 3/2015 | Moyer | |
| 9,535,804 B2 | 1/2017 | Kaplan et al. | |
| 2003/0005385 A1 | 1/2003 | Stieger | |
| 2004/0163027 A1 | 8/2004 | MacLaren et al. | |
| 2006/0123321 A1 | 6/2006 | Deenadhayalan et al. | |
| 2009/0265579 A1 | 10/2009 | Yoshida | |
| 2010/0153821 A1 | 6/2010 | Keeler et al. | |
| 2010/0185897 A1 | 7/2010 | Abts et al. | |
| 2010/0217915 A1* | 8/2010 | O'Connor | G06F 11/1004 711/5 |
| 2012/0204005 A1 | 8/2012 | Dockser et al. | |
| 2012/0233498 A1* | 9/2012 | Ramaraju | G06F 11/1064 714/23 |
| 2014/0298140 A1* | 10/2014 | Yigzaw | G06F 11/1064 714/768 |
| 2017/0068596 A1 | 3/2017 | Kaplan et al. | |

OTHER PUBLICATIONS

Castagna, Paolo et al. "Vivisecting LUBM," Hewlett-Packard Development Co., L.P., HPL-2009-348, Nov. 6, 2009, 17 pages.

Final Office Action for U.S. Appl. No. 13/476,819, dated Sep. 29, 2015, 25 pages.

Ge-Ming Chiu; Chiu, J.F., "A New Diskless Checkpointing Approach for Multiple Processor Failures," Dependable and Secure Computing, IEEE Transactions on , vol. 8, No. 4, pp. 481 ,493, Jul.-Aug. 2011.

Plank, J.S.; Li, K.; Puening, M.A., "Diskless checkpointing," Parallel and Distributed Systems, IEEE Transactions on, vol. 9, No. 1 0, pp. 972,986, Oct. 1998.

Plank, James S., "A New MDS Erasure Code for RAID-6," Department of Electrical Engineering and Computer Science, University of Tennessee, Technical Report CS-07-602, Sep. 2007, 14 pages.

Zizhong Chen; Dongarra, J., "Algorithm-Based Fault Tolerance for Fail-Stop Failures," Parallel and Distributed Systems, IEEE Transactions on , vol. 19, No. 12, pp. 1628, 1641, Dec. 2008.

* cited by examiner

RESILIENCY TO MEMORY FAILURES IN COMPUTER SYSTEMS

CROSS-REFERENCE TO RELATED APPLICATION(S)

This application is a continuation of U.S. patent application Ser. No. 15/357,448, filed Nov. 21, 2016, entitled "RESILIENCY TO MEMORY FAILURES IN COMPUTER SYSTEMS," which is a continuation of U.S. patent application Ser. No. 13/476,819, filed May 21, 2012, entitled "RESILIENCY TO MEMORY FAILURES IN COMPUTER SYSTEMS," now U.S. Pat. No. 9,535,804, both of which applications are incorporated herein by reference in their entireties.

FEDERALLY SPONSORED RESEARCH OR DEVELOPMENT

This invention was made with United States Government support under Agreement No. H98230-09-C-1052 awarded by the Maryland Procurement Office. The Government has certain rights in the invention.

BACKGROUND

Massively Parallel Processing ("MPP") computer systems are becoming increasingly larger. Such MPP computer systems commonly have 20,000+ sockets (sometimes with multiple processors per socket) that are connected via a high-speed network interconnect and that share a memory that may have its sized measured in terabytes. To take advantage of the increased processing power of these MPP computer systems, increasingly complex application programs are being developed. These application programs may have tasks executing on thousands of processors simultaneously and may take many hours to complete their execution.

As the number of processors and the density of the components in the MPP computer system increase and the complexity of the application programs increases, the probability of having a component fail during execution of an application program also increases. The failure of even a single component during execution of an application processor execution is wasted. In addition, as the probability of a component failure increases, the likelihood that such an application program will successfully execute from its beginning until its end without any failure decreases.

Some runtime systems and application programs help ensure that execution of the application programs continues in the face of component failures or resumes without having to be restarted at the beginning. Traditional strategies for providing application programs with such "fault tolerance" have several limitations. Some of these strategies, such as system-directed checkpoints, do not scale well and appear to be reaching their limits as the number of processors and the amount of memory continue to increase. Some strategies also impose significant burdens on the application programmer and require a significant computational overhead during execution.

It would be desirable to minimize the impact of component failures so that the likelihood that an application program will successfully execute without failure increases and the amount of wasted processor resources is minimized.

DETAILED DESCRIPTION

Figure 1:
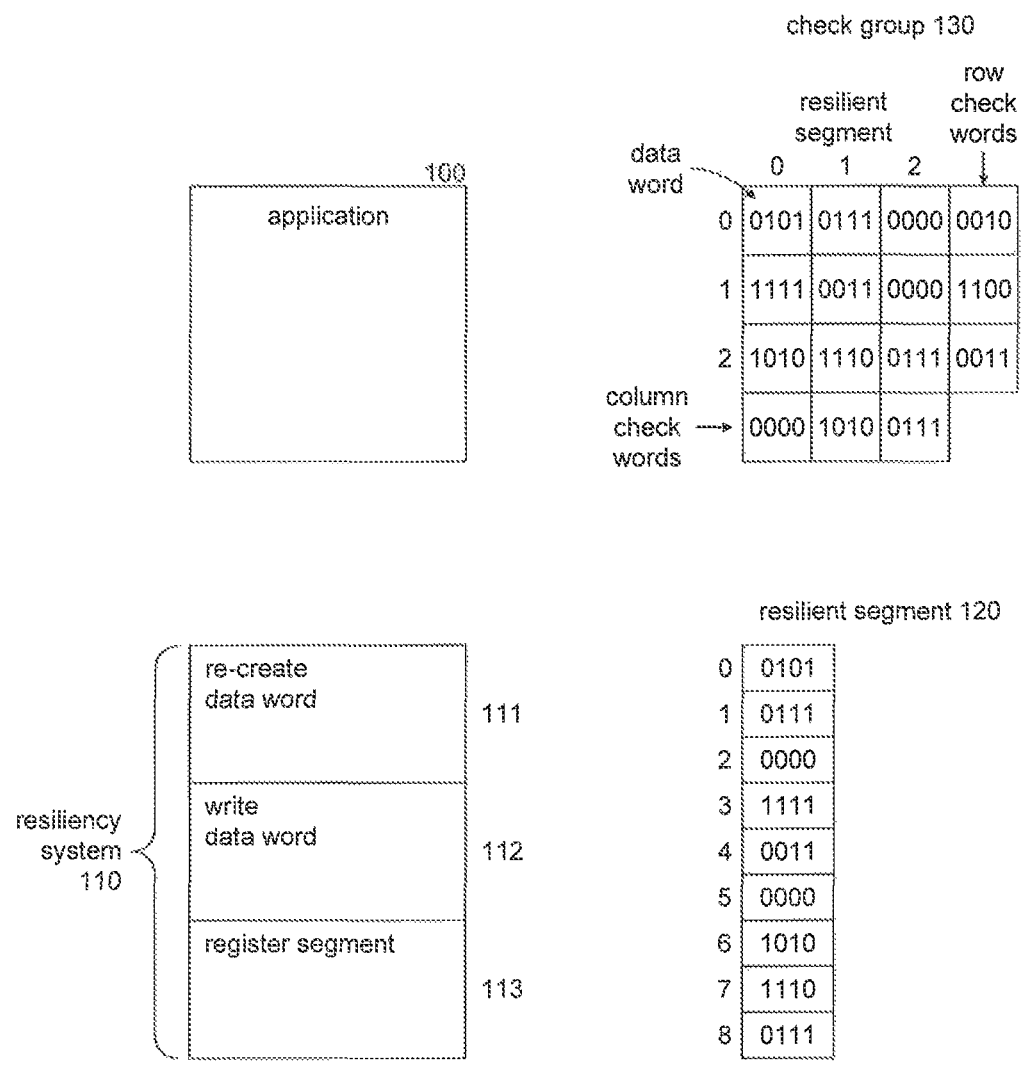
FIG. 1 is a block diagram that illustrates components of the resiliency system and error correction information for a resilient segment in some embodiments.

A method and system for correcting memory errors reported by a memory system of a computer system is provided. In some embodiments, a resiliency system detects memory errors reported by the memory system when loading from a memory location and re-creates the data of that memory location using previously stored error correction information. When a program stores data into the memory location, the resiliency system executing on the computer system generates and stores error correction information for the data that is being stored. When the program then executes a load instruction to retrieve the data from the memory location, the load instruction completes normally if there is no memory error. If, however, there is a memory error, the computer system passes control to the resiliency system (e.g., via a trap) to handle the memory error. The resiliency system retrieves the error correction information for the memory location and re-creates the data of the memory location. The resiliency system then stores the data (e.g., to a register) as if the load instruction had completed normally, optionally stores re-created data back in memory, and passes control to the next instruction of the program. The resiliency system thus allows programs to be more resilient to memory errors, reducing the likelihood that a program will fail during its execution and possibly reducing the need for programs to implement strategies to recover from such failures.

In some embodiments, the resiliency system adds no overhead to programs when loading from a "resilient memory location" if no memory error occurs. The resiliency system, however, adds overhead when correcting a memory error and when storing into a resilient memory location. Overhead is added when a memory error is reported during the loading from a resilient memory location and control is passed to the resiliency system (e.g., as a result of a trap) which corrects the memory error by re-creating content of the resilient memory location (if possible). Since memory errors are expected to be relatively rare, this overhead is incurred infrequently and is not likely to have a significant impact on the performance of a typical program that loads from resilient memory locations. Moreover, the overhead incurred to correct the memory error would likely be much less than if the program failed and needed to recover. Overhead is also added when storing into a resilient memory location. When the content of a resilient memory location is to be changed, the resiliency system generates error correction information (e.g., a correction word) and stores the error correction information separately from the resilient memory location. The resiliency system may provide the program (or a runtime supporting the program) with a store function that is to be invoked when storing to a resilient memory loc—ation to pass control to the resiliency system for generating the error correction information. Alternatively, depending on the architecture of the computer system, control may be passed to the resiliency system (e.g., as a result of a trap) whenever a store (e.g., execution of a store instruction) is attempted to a resilient memory location. (Because there is no per-load overhead when a memory error is not encountered, the resiliency system may be particularly well-suited to provide resiliency to data structures that are read-only or read-mostly.)

In some embodiments, an application program registers with the resiliency system a segment of memory locations (that are contiguous within the address space of the application program) that are to be made resilient during execution of the application program. A registered segment is referred to as a "resilient segment" of resilient memory locations. When data is stored into a memory location of a resilient segment, the resiliency system generates and stores the error correction information for the data of that memory location. The resiliency system may use any of a variety of error correction codes or techniques to generate the error correction information for the data and to re-create the data from the error correction information. In some embodiments, the resiliency system may employ a parity-based error correction technique. The resiliency system may generate a parity "check word" that is exclusive-OR ("XOR") of a subset of "data words" of the resilient segment, referred to as a "check unit." The term "data word" refers to the word of data of the application program stored in a resilient segment, and the term "check word" refers to a word of error correction information generated for the resilient segment. The resiliency system stores each check word in association with the corresponding check unit of the resilient segment. To regenerate the check word when a data word has changed, the resiliency system retrieves the data words of the check unit that includes that data word, generates the XOR of the data words, and stores the result in the check word for that check unit. When a memory error occurs during execution of a load instruction from a target address of a data word, the resiliency system is passed control (e.g., via a trap), loads the check word and each other data word of the check unit that includes that data word, and generates the XOR of those words. The result of the XOR is the re-created data word for the target address. The resiliency system then provides that re-created data word as the result of the load instruction, for example, by storing the re-created data word in a target register of the load instruction. The resiliency system then passes control back to the application program to continue execution at the next instruction after the load instruction. The actual re-creating of such a data word is generally transparent to the execution of the application program except possibly for the extra time needed to complete the load instruction. In some embodiments, the resiliency system may execute at an application program privilege level, depending on the architecture of the processor, to avoid context switching associated with switching to and from a higher privilege level (e.g., kernel privilege level).

In some embodiments, the resiliency system may install a memory error handler that is passed control whenever the memory system detects a memory error in the loading of a resilient memory location. For example, the memory system may detect a memory error when the parity of the content of a resilient memory location does not match the parity bit for that memory location. Although such memory systems may have the ability to correct some problems during the loading of a memory location, problems that are detected but cannot be corrected are referred to as "uncorrectable memory errors" or simply "memory errors" as reported by the memory system. When the memory system reports a memory error during execution of a load instruction (e.g., a native instruction of the instruction set of the processor) by a program (e.g., application program), the memory error handler is passed control by the processor and identifies the memory location (e.g., by target address) that was being loaded from, retrieves the error correction information for that memory location (e.g., check word and other data words of a check unit), re-creates the content of the memory location, and stores (e.g., in the target register) the re-created content as the result of the load instruction. The processor then passes control back to the application program at the next instruction that is be executed after the load instruction. The processor does not consider a load instruction that encounters the memory error to be complete until control is passed back to the application program by the memory error handler. The thread of the program that issued the load instruction can continue its execution after the load instruction completes in the same manner irrespective of whether the content was loaded without any memory error or whether the content was re-created because of a memory error. As discussed above, the only per-load overhead in some embodiments is when a memory error is detected, and such incurred overhead results from increased execution time of the load instruction. In this way, the resiliency system can reduce the impact of memory errors on a program by correcting memory errors when loading from a resilient memory location in a way that is generally transparent to the program.

FIG. 1 is a block diagram that illustrates components of the resiliency system and error correction information for a resilient segment in some embodiments. An application program 100 interacts with a resiliency system 110 to register a resilient segment 120. The resilient segment in this example is an array of nine 4-bit data words. The number of bits per data word depends on the underlying architecture of the computer system and can be, for example, 32 bits, 64 bits, and so on. The number of data words in a resilient segment may depend on the specific error correction code being used. In the example of FIG. 1, a two-dimensional parity error correction code is illustrated, and thus the number of data words in the resilient segment is generally a multiple of the square of a number (e.g., 3) and padding data words can be added as needed. The application program 100 invokes a register segment component 113 of the resiliency system 110 to register the resilient segment 120. The application program provides to the register segment component an indication of the address of the block of memory that is to form the resilient segment. The application program may also provide additional information such as the length of the block of memory, a specification of the error correction code that is to be used (e.g., one-dimensional parity or two-dimensional parity), the location of where to store the error correction information, and so on. The resiliency system stores the error correction information in a data structure associated with the resilient segment and installs a re-create data word component 111 as a trap handler for memory errors.

After registration, the application program may use a write data word component 112 (also referred to as a store data word component) of the resiliency system to write each data word to a resilient segment. The resilient segment along with its error correction information is illustrated by check group 130. The check group 130, which is represented in a logical organization and not as laid out in memory, includes the data words of the resilient segment illustrated as a matrix with error correction information appended to each row and each column of the matrix representing a two-dimensional parity error correction code. The matrix is a 3-by-3 matrix with a cell for each data word of the resilient segment. The cell (0,0) corresponds to the data word at offset (or index) zero of the resilient segment, the cell (0,1) corresponds to the data word at offset one of the resilient segment, . . . , and the cell (2,2) corresponds to the data word at offset eight of the resiliency segment. The error correction information includes a row check word for each row of the matrix and a column check word for each column of the matrix. Each row and each column along with the corresponding check word for that row or column form a separate "check unit" of the check group. For example, the data words of row 0 and the corresponding row check word aligned with row 0 form a check unit, and the data words of column 0 and the corresponding column check word aligned with column 0 form another check unit. The check group 130 has six check units—one for each row and one for each column. Each data word is also in two different check units: a row check unit and a column check unit. The resiliency system sets the check word of the check unit to the XOR of the data words of the check unit.

When the application program 100 executes a load instruction to load the data word at a target address of the resilient segment 120 into a target location (e.g., a target register) and a memory error occurs, the re-create data word component 111 of the resiliency system that was installed as a trap handler is passed control. The re-create data word component is provided the target address of the load instruction. The re-create data word component can uniquely identify a check unit for a data word from the address of the data word. The re-create data word component loads the data words (other than the data word at the target address) and the check word for the check unit. The re-create data word component generates the XOR of the loaded data words and the check word. The result of the XOR is the re-created data word of the target address. If a memory error occurred when loading the other data words or the check word of the check unit, then the resiliency system would not have been able to re-create the data word from the loaded words because an XOR parity error correction code typically can only correct a single data word error in a check unit. However, because the error correction code is two-dimensional, the resiliency system first attempts to re-create a data word using one check unit for that data word, and if that fails, attempts to re-create the data word using the other check unit for that data word. For example, the resiliency system may first attempt to re-create the data word in a first direction (e.g., using a row check unit) and then to re-create the data word in a second direction (e.g., using a column check unit). In addition, when the resiliency system detects a memory error in loading a data word of a check unit during error correction, the resiliency system may be able to recursively re-create that data word and use that re-created data word to re-create the data word of the target address. Once the data word of the target address is re-created, the resiliency system stores the re-created data word in the target location (e.g., target register) of the load instruction and returns control to the application program.

Figure 2:
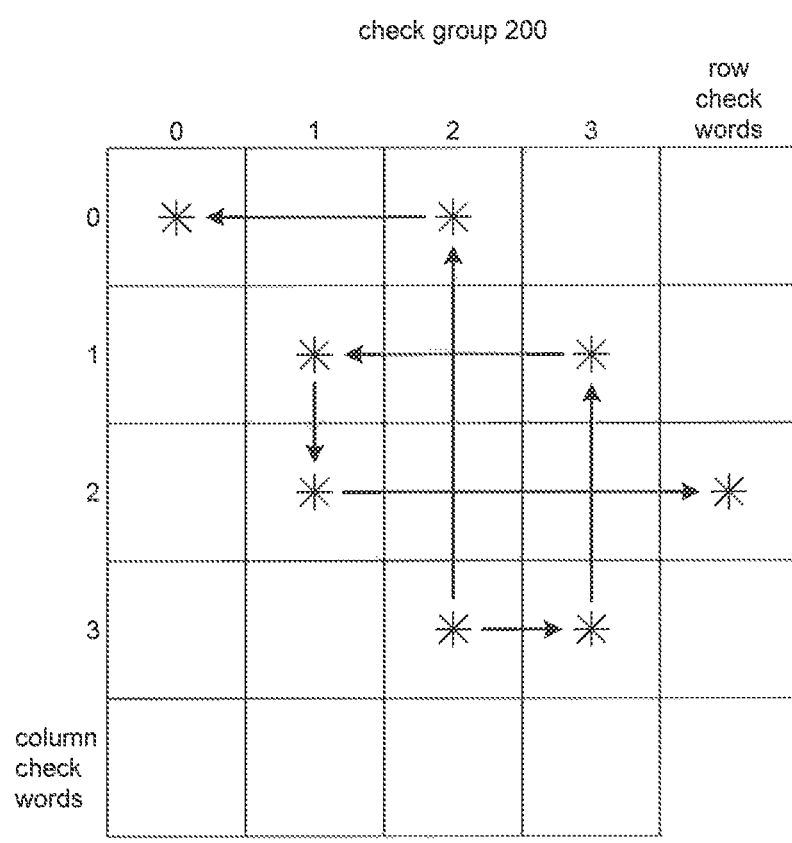
FIG. 2 is a diagram that illustrates the recursive re-creation of data words in some embodiments.

FIG. 2 is a diagram that illustrates the recursive re-creation of data words in some embodiments. In the example of FIG. 2, a check group 200 represents a resilient segment that has 16 data words forming a 4-by-4 matrix of the check group with 4 row check units and 4 column check units. The asterisk within a cell of the matrix indicates that a memory error is encountered when loading from the data word of that cell. For example, because cell (0,0) contains an asterisk, an attempt to load from the data word of that cell will result in a memory error. In contrast, because cell (0,1) has no asterisk, the data word of that cell will be loaded without a memory error. An application program may execute a load instruction to load the data word of cell (3,2) (e.g., the target address) into a target register. If so, the memory system will report a memory error and control will be passed to the re-create data word component of the resiliency system. The resiliency system may initially attempt to re-create the data word of cell (3,2) by loading the other data words and the check word of the row check unit that contains cell (3,2), that is, the check unit of row 3. In this example, the asterisk in cell (3,3) indicates that a memory error occurs when loading the data word of that cell. So the resiliency system attempts to re-create the data word of cell (3,3) using the check unit of column 3. In this example, the resiliency system encounters another memory error when loading cell (1,3) of the check unit of column 3. The resiliency system then attempts to re-create the data word of cell (1,3) using the check unit of row 1. The resiliency system then encounters another memory error when loading cell (1,1) of the check unit of row 1. The resiliency system then attempts to re-create the data word of cell (1,1) using the check unit of column 1. The resiliency system then encounters another memory error when loading the data word of cell (2,1) of the check unit of column 1. The resiliency system then attempts to re-create the data word of cell (2,1) using the check unit of row 2. The resiliency system will encounter another error when loading the row check word for the check unit of row 2. The resiliency system, in this example, cannot re-create a check word because the resiliency system does not store error correction information for check words. As a result, the attempt to re-create the data word of cell (3,2) starting with the check unit of row 3 was unsuccessful. The resiliency system then attempts to re-create the data word of cell (3,2) in the other direction starting with the check unit of column 2. The resiliency system encounters a memory error when loading the data word of cell (0,2) of the check unit of column 2. The resiliency system then attempts to re-create the data word of cell (0,2) using the check unit of row 0. The resiliency system then encounters a memory error when loading the data word of cell (0,0) of the check unit of row 0. The resiliency system then attempts to re-create the data word of cell (0,0) using the check unit of column 0. Since all the other data words and the check word for the check unit of column 0 can be loaded without memory error, the resiliency system re-creates the data word of cell (0,0). The resiliency system then re-creates that data word of cell (0,2)

using the re-created data word of cell (0,0) and finally re-creates the data word of cell (3,2) using the re-created data word of cell (0,2) and stores that re-created data word in the target location of the load instruction. In some embodiments, each memory error encountered when attempting to re-create a data word results in a recursive invocation of components of the resiliency system unless it is determined that a certain memory error cannot be corrected (at least in a certain direction).

Memory systems typically load an entire cache line of memory locations into a cache when a load instruction is executed that accesses any one of the memory locations within the cache line and the cache line is not currently cached. For example, if a cache line contains eight words, then the memory system will load memory locations 0-7 upon execution of a load instruction for any one of locations 0-7, memory locations 8-15 upon execution of a load instruction for any one of locations 8-15, and so on. If a memory error occurs when loading a word of a cache line, some memory systems may have a memory error flag for each word of the cache line to identify the word(s) to which the memory error(s) applies. Some memory systems, however, only have memory error flags (also referred to as non-specific memory error signals) for groups of words in a cache line, referred to as a memory error unit. For example, a memory system may have only one memory error flag for the cache line (only one memory error unit) or have one memory error flag for the first half of the cache line (a first memory error unit) and a second memory error flag for the second half of the cache line (a second memory error unit).

When a memory error unit has multiple words, the resiliency system is unable to determine whether the data word that was the target of a load was loaded correctly or not. So the resiliency system attempts to re-create that data word by loading the other data words of the check unit. If, however, another data word of the check unit is in the same memory error unit, that check unit will have two data words with a reported memory error—although the memory error may have occurred in the other words of the memory error unit. As such, the resiliency system might attempt to re-create that other data word of the check unit. That attempt might be successful or not, but nevertheless the attempt is additional overhead that might be avoided. Moreover, the presence of multiple memory errors reduces the likelihood that the resiliency system will ultimately be able to re-create a data word. In some embodiments, the resiliency system defines check units so that no two data words of a check unit are in the same memory error unit to avoid having to handle additional memory errors from that same memory error unit when re-creating a data word. For example, if an application program defines a resilient segment with 256 data words, the resiliency system may define 16 different check groups for the resilient segment covering 16 data words each. In such a case, the resiliency system may define the first check group to include memory locations 0, 16, 32, 48, and so on of the resilient segment, the second check group to include memory locations 1, 17, 33, 49, and so on of the resilient segment, and the other check groups to include memory locations defined in a similar manner. As a result of this definition, no check group (and thus no check unit) will contain data words that would be in the same memory error unit. Although with such a definition the resiliency system would not fully benefit from cache line pre-fetching when re-creating a data word, the improved likelihood of successfully re-creating data words with such a definition would likely be a much greater benefit, especially since memory errors should occur only during a very small percentage of the loads.

In some embodiments, when the resiliency system executes on an MPP computer system with a shared memory that is distributed among the processors (or nodes), the resiliency system may define check groups (or more finely check units) so that each check group (or check unit) has no data words (or any word—data words and check words) in the memory of the same processor. If the MPP computer system has 16 nodes with each storing 16 data words of the 256 data words of the resilient segment described above, then the resiliency system may define the first check group to include the first data word stored at each node, the second check group to include the second data word stored at each node, and so on. In this way, the resiliency system can re-create data words stored at a failed node using the data words of the check groups stored at the other nodes since a single node failure will result only in one memory error for the data words of a check group. The resiliency system may designate a backup node that, upon detecting that a node has failed, reconstructs the data words and the check words of the failed node. Once the backup node completes the reconstruction, the backup node makes its memory available to the address space shared by the other nodes that are executing the application program and notifies the other nodes so that memory accesses previously directed at the failed node are now directed to the backup node. During the failure and subsequent reconstruction, the resiliency system at each node will independently detect a memory error when a load instruction is issued to the failed node and will reconstruct the data word of the failed node using the error correction information stored at the other nodes.

Figure 3:
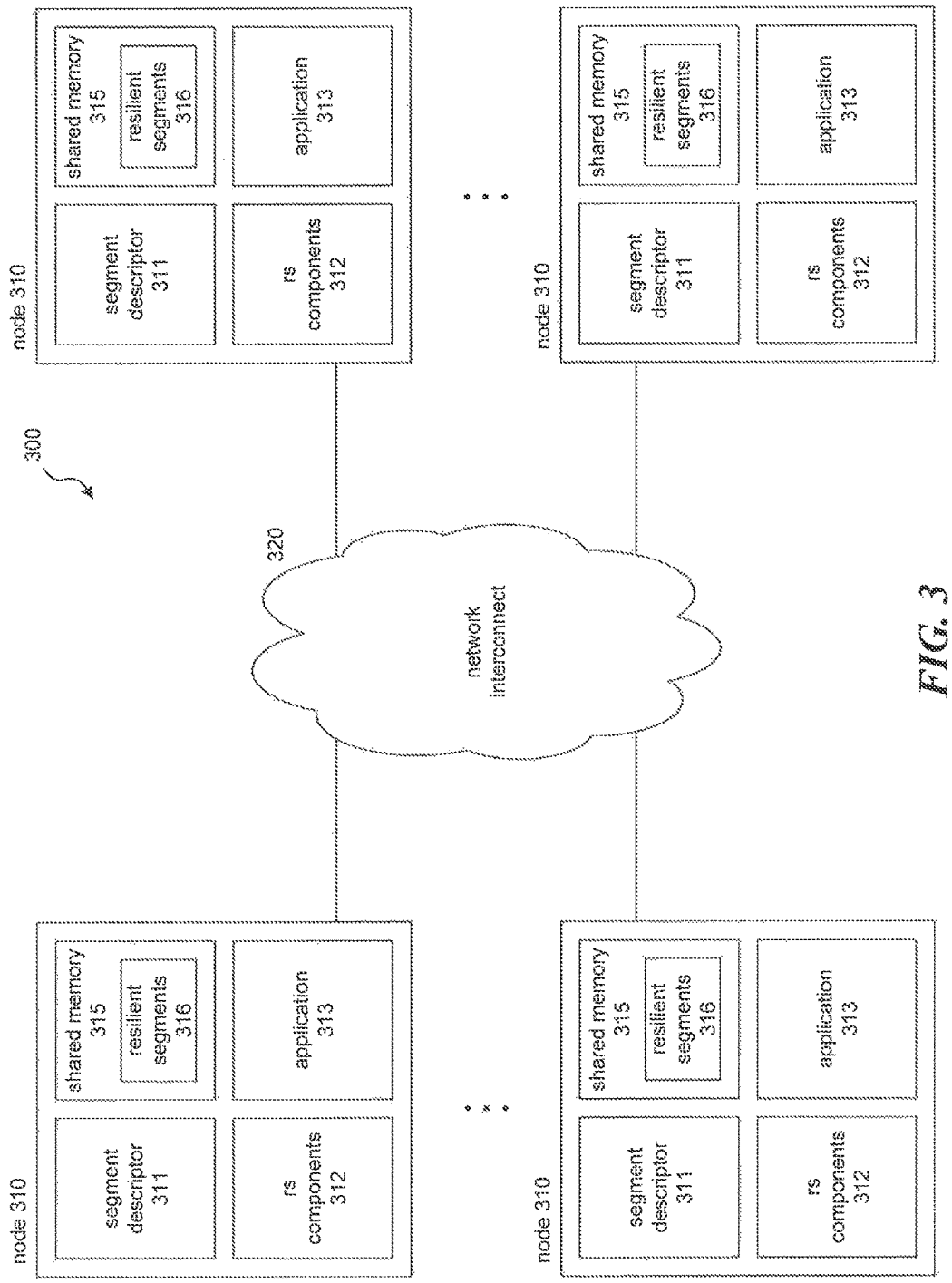
FIG. 3 is a block diagram illustrating components of the resiliency system in an MPP computer system.

FIG. 3 is a block diagram illustrating components of the resiliency system in an MPP computer system. The MPP computer system 300 includes nodes 310 interconnected via a network interconnect 320. Each node includes one or more processors, a portion of shared memory, local memory, a network interface, and so on. Each node contains a segment descriptor 311, resiliency system components 312, an application program 313, and a portion of the shared memory 315. The nodes execute the threads of application programs in parallel. The resiliency system provides the application programs with access to resilient segments stored in memory. The resiliency system may be incorporated within an operating system or runtime that provides services to the application programs. The multiprocessor system may be the Cray XMT or other multiprocessor system that may include a commodity or an off-the-shelf processor such as an x86 or ARM processor. When the application program registers with the resiliency system a segment to be made resilient, the resiliency system initializes the segment descriptor for the resilient segment. The shared memory includes a portion of a resilient segment 316. The storage of the resilient segment may be distributed to the shared memory associated with multiple nodes. In some embodiments, the resiliency system executes on an MPP computer system that provides a native load instruction for loading from shared memory associated with the local node and from shared memory associated with remote nodes in a way that is transparent to the application program that issued the load instruction. In other embodiments, the resiliency system executes on an MPP computer system that provides a native load instruction for loading from shared memory associated with the local node and either a different native load instruction or a memory load function (of a runtime) for loading from shared memory associated with remote nodes.

Although the resiliency system has been described in the context of an MPP computer system, the resiliency system may be used on a single computer with a single processor, a computer system with multiple interconnected computers, or other type of computing system and may be used with memory that is not shared and not distributed.

The processor on which the resiliency system may be implemented may include a central processing unit and input devices (e.g., keyboard and pointing devices), output devices (e.g., display devices), and storage devices (e.g., disk drives). The processors may access computer-readable media that includes computer-readable storage media and data transmission media. The computer-readable storage media includes memory and other tangible storage devices that may have recorded upon or may be encoded with computer-executable instructions or logic that implements the resiliency system. The data transmission media is media for transmitting data using signals or carrier waves (e.g., electromagnetism) via a wire or wireless connection.

The resiliency system may be described in the general context of computer-executable instructions, such as program modules, executed by one or more computers, processors, or other devices. Generally, program modules include routines, programs, objects, components, data structures, and so on that perform particular tasks or implement particular data types. Typically, the functionality of the program modules may be combined or distributed as desired in various embodiments.

Figure 4:
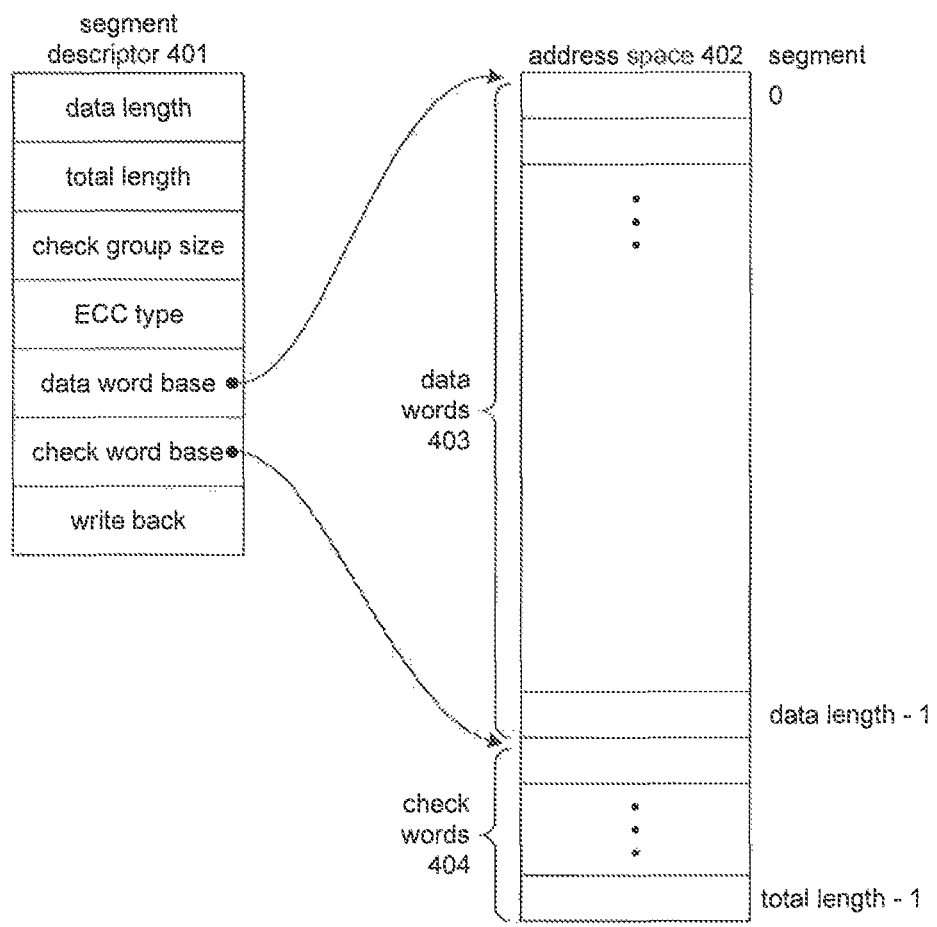
FIG. 4 is a diagram that illustrates a data structure for a segment descriptor for a resilient segment in some embodiments.

FIG. 4 is a diagram that illustrates a data structure for a segment descriptor for a resilient segment in some embodiments. A segment descriptor 401 includes information defining a segment 402 that an application program has registered to be made resilient. The segment descriptor includes a data length field, a total length field, a check group size field, an ECC type field, a data word base field, a check word base field, and a write back field. The segment 402 includes data words 403 and check words 404. Although the segment is illustrated as being in contiguous memory locations, the check words can be stored separately from the data words. Moreover, neither the data words nor the check words need be stored in contiguous memory locations. The data length field indicates the number of data words of the segment. The total length field indicates the total number of check words and data words of the segment. The check group size field indicates the number of data words in a check group. The ECC type field indicates the type of error correction code ECC to be used by the resiliency system. The resiliency system may provide support for various error correction codes or algorithms that can be selected by an application program or may even allow an application program or system to designate its own error correction algorithm for use by the resiliency system. The data word base field contains a pointer to the start of the segment. The check word base field contains a pointer to the start of the check words. The write back field contains a flag indicating whether a re-created data word should be stored at the target address. The writing back of a re-created data word may be useful when a memory error in a memory location is transient. Also, the writing back of a re-created data word does not incur the overhead of changing a data word as the check words for the re-created data word do not need to be recalculated. The segment descriptor may also have various other fields such as a pointer to an array of locks for locking portions of the segment when the segment is being updated. As described below in more detail, the check words are arranged in memory so that the location of the check word for a check unit can be calculated from each address of the data words of that check unit.

Figure 5:
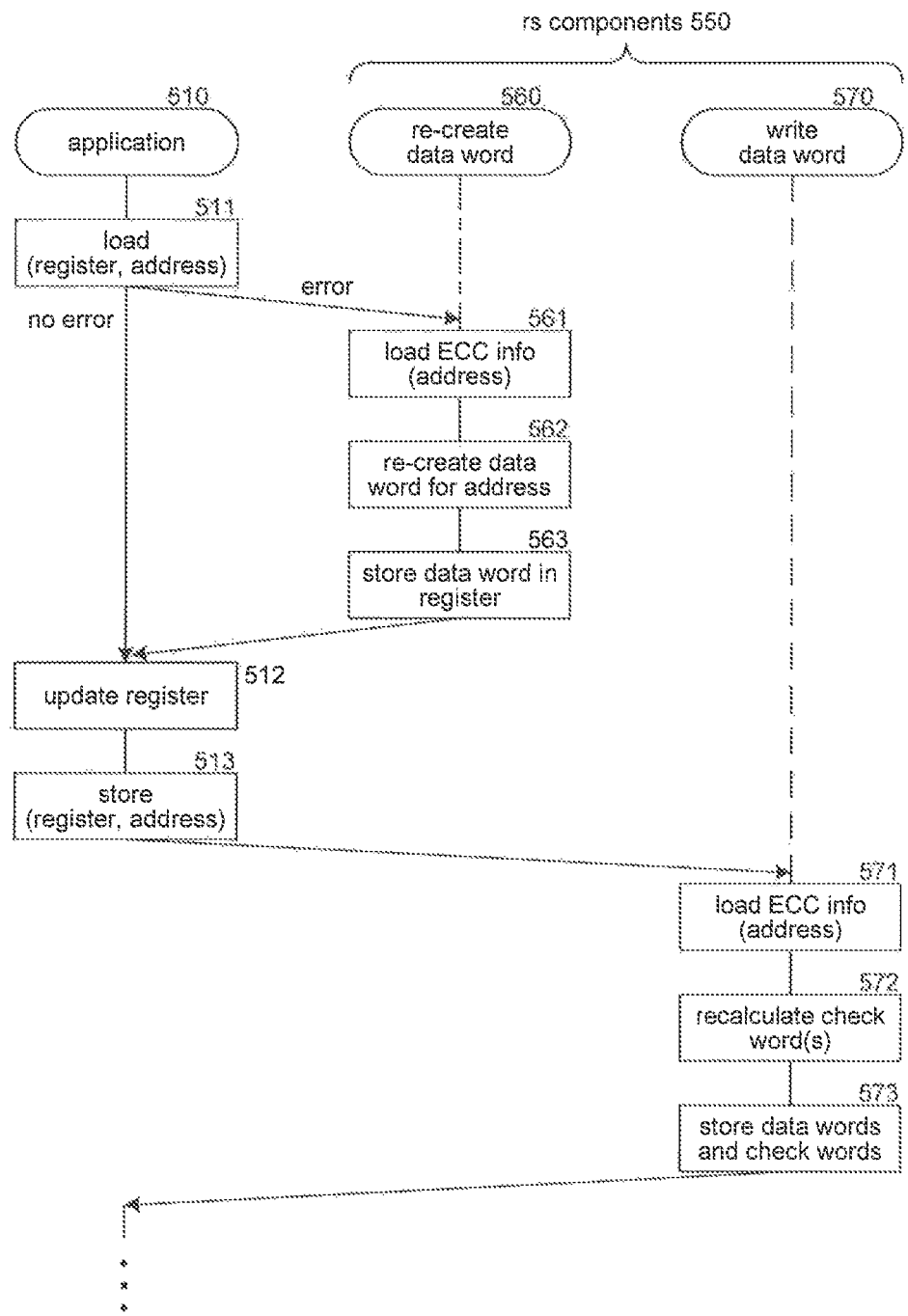
FIG. 5 is a flow diagram that illustrates the interaction of an application program and the components of the resiliency system in some embodiments.

FIG. 5 is a flow diagram that illustrates the interaction of an application program and the components of the resiliency system in some embodiments. An application program 510 interacts with a re-create data word component 560 and a write data word component 570 of the resiliency system components 550 to re-create data words and store data words. In block 511, the application program issues a load instruction indicating a target address and a target register. If no memory error occurs, then the application program continues to execute the next instruction at block 512. If, however, a memory error occurs, the re-create data word component of the resiliency system is invoked. The re-create data word component may be registered by the resiliency system with the computer system or the operating system as a handler to process memory errors that occur within a resilient segment. In block 561, the component loads the error correction information (e.g., other data words and the check word of a check unit) associated with the target address of the load instruction. In block 562, the component re-creates the data word for the target address using the error correction information. In block 563, the component stores the re-created data word in the target register and then passes control to the next instruction of the application program at block 512. In blocks 512 and 513, the application program changes the data that was loaded from the target address and stores the new data into the target address. In block 512, the application program stores the new data in a source register. In block 513, the application program invokes the write data word component of the resiliency system to store the new data of the source register at the target address. In block 571, the write data word component loads the error correction information for the target address. In block 572, the component recalculates the error correction information (e.g., check word) based on the source register. In some embodiments, to recalculate the check word, the component loads the current check word and the current data word of the target address, XORs the current data word with the current check word, XORs the result with the new data word, and stores the result in the check word. If a non-XOR error connection code is employed, then the other data words of the check unit may need to be loaded to generate the error connection information. In block 573, the component stores the recalculated error correction information into memory and stores the contents of the source register at the target address. The component then passes control to the application program to execute its next instruction.

The resiliency system employs an error correction code that is an erasure code. Erasure correction codes encode data so that the original data can be regenerated even if part of the encoded data becomes corrupted. An erasure is a form of corruption in which part of the encoded data is lost. For example, if the encoded data is transmitted to a receiver in several packets, then a lost packet represents an erasure. When the receiver is notified of the loss, the receiver can regenerate the data of the lost packet from the encoded data of the other packets. Error correction codes that handle these erasures are known as erasure codes. The resiliency system employs erasure codes to recover from both single-word memory errors and failed or lost nodes. A subclass of error correction codes, known as Maximal Distance Separable ("MDS") codes, allows the original data to be regenerated from any portion of the encoded data that is equal in length to the original data. The resiliency system may use a systematic code in which the first part of encoded data is the original data. The use of a systematic code allows the resiliency system to store the data words of a resilient segment without modification so the data words can be loaded without any decoding when there is no memory error or no erasure. The resiliency system may be used in conjunction with various error correction codes such as Reed-Solomon codes, Cauchy Reed-Solomon codes, EVENODD codes, RDP codes, Full-2 Parity codes, Liberation codes, and so on. (See J. Plank, "A New MDS Erasure Code for RAID-6," Technical Report CS-07-602, Univ. of Tennessee, September 2007, which is hereby incorporated by reference.) As described herein, the resiliency system employs a two-dimensional parity code and may also employ a one-dimensional parity code.

In some embodiment the resiliency system provides an application program interface ("API") for providing resiliency to memory locations loaded by an application program. The API may include a register function through which an application program can register a segment of memory locations that is to be made resilient. The register function generates a segment descriptor for the segment as described above. The API may include a load function through which a process other than the process that registered a segment (e.g., executing on a different node) can map to the same segment. The API may also include a reference function to map a segment defined by a segment descriptor to the address space of the application program, which may be distributed across multiple nodes. The API may also include a write function through which an application program can update a data word (and corresponding check words) of a resilient segment. The API may also provide a memory copy function to copy a block of words to a resilient segment and then update the check words. The memory copy function may update the check words for each check unit only once and thus can avoid the multiple updates of a check word that would occur if each data word of a check unit was updated individually using the write function. The API may also include a user error correction code component that registers user-supplied error correction functions for use by the resiliency system for re-creating a data word when a memory error occurs and for storing a data word in memory. The re-create data word component and the write data word component use the registered error correction functions to access a resilient segment. The user-supplied error connection function can employ a variety of error correction codes such as described above.

In some embodiments, the resiliency system assigns data words in the same memory error unit of the memory system to different check units and identifies the check word for a check unit from the address of the data word. The resiliency system may organize the layout of the data words and check words in memory to facilitate mapping an address of a data word to its corresponding row and column check words. The resiliency system may logically organize the check groups into blocks of check groups. Each block has a number of check groups that is equal to the number of words in the memory error unit. To identify a check word for a data word, the resiliency system may first subtract the data word base from the address to give an index (or offset) of that data word in the data word portion of the resilient segment. The data word index may be divided into four fields: x, y, z, and c. The x field represents a block of check groups that includes the check group of the data word, the y field represents the row of the data word in its check group, the z field represents the column of the data word in its check group, and the c field represents the check group of the data word within its block. Thus, the concatenation of the x field and the c field identifies the check group of the data word. As an example, if a resilient segment has $2^{16}$ data words, then the index may be represented by 16 bits. If there are 64 check blocks with 4 check groups each and each check group has 256 data words, then the x field is 6 bits, the y field is 4 bits, the z field is 4 bits, and the c field is 2 bits. The data word with the 16-bit index of "0001100000010101" is in row 0 (i.e., "0000") at column 5 (i.e., "0101") of check group 1 (i.e., "01") of block 6 (i.e., "000110"). The index into the check word portion (of the resilient segment) of the corresponding row check word is represented by the concatenation of the x field, "0," the y field, and the c field, which in the example would be "00011000010101." This concatenation maps all data words in the same row of the same check group to the same row check word. The index of the corresponding column check word is represented by the concatenation of the x field, "1," the z field, and the c field, which in the example would be "00011010010101." This concatenation maps all data words in the same column of the same check group to the same column check word. The resiliency system then adds the index of the check word to the check word base to generate the address of the check word within the resilient segment.

In some embodiments, the resiliency system may allow an updater program to update the data words of a resilient segment only when the update program has exclusive access to the resilient segment. The resiliency system may provide a locking mechanism to synchronize the updating of the data words of the same check group by multiple threads of the updater program. If locking is requested when a resilient segment is registered, the resiliency system allocates an array of lock words. The array may include a lock word covering the check groups with data words that are in the same memory error unit. For example, if a memory error unit is four words, then each word is in a different check group and the resiliency system may have a single lock word to protect the set of four check groups as a unit. Alternatively, the resiliency system may use more granular locking but with added complexity in terms of memory space and computation or less granular locking but with the possibility of increased contention. The resiliency system may implement recursive locks so that the locks may be acquired recursively by the same thread. Such recursive locks may be helpful when a lock word is locked for a write and an error occurs during the write resulting in execution of the memory error handler that locks the same lock word. To prevent deadlocks, the threads may acquire the locks in a defined order such as in segment number order (if there are multiple resilient segments) and ascending order of addresses within each resilient segment.

In some embodiments, the resiliency system may be used in conjunction with a Distributed Global Address Space ("DGAS") library or other libraries that provide a load function through which an application program accesses data stored in memory. When an application invokes the load function directly or indirectly via a runtime, the resiliency system intercepts the invocation and then invokes the load function of the library on behalf of the application program. When the load function returns to the resiliency system, the resiliency system checks for a memory error and re-creates the data word if necessary. The resiliency system then returns to the application program the data word that may have been re-created. The resiliency system also intercepts invocations of a store function of the library and calculates check words and then invokes the store function of the library to store the data word on behalf of the application program and to store the check words.

Figure 6:
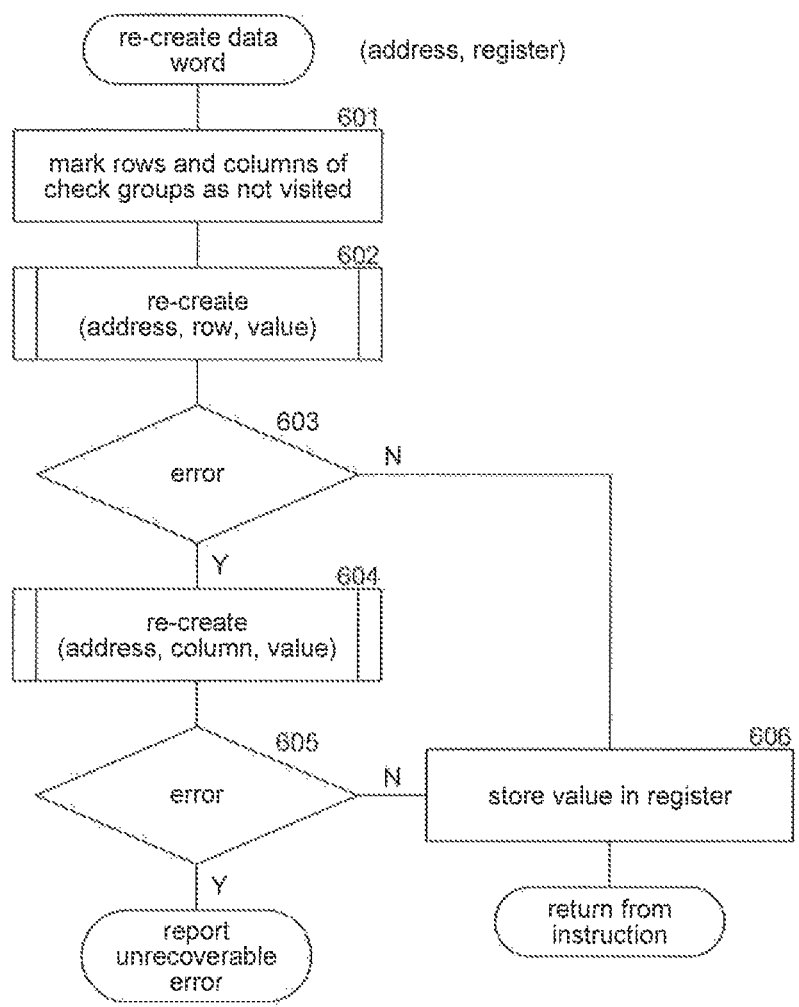
FIG. 6 is a flow diagram that illustrates the processing of the re-create data word component of the resiliency system in some embodiments.

FIG. 6 is a flow diagram that illustrates the processing of the re-create data word component of the resiliency system in some embodiments. The resiliency system may register the component as a trap handler for the memory errors. When a memory error is detected in a data word of a resilient segment, the component is passed control. The component identifies the target address of the load instruction, re-creates the data word of the target address, and stores the re-created data word in the target register of the load instruction. In block 601, the component marks the rows and column check units of the check group that contains the target address as not visited. The component uses the visited information to identify when recursive invocations to re-create data words of a check group cannot successfully re-create the data word of the target address. In block 602, the component invokes a re-create component passing an indication of the target address and an indication to attempt to re-create using the row check unit of the data word and receiving the re-created value of the data word in return. In decision block 603, if an error occurred when attempting to re-create the data word, then the component continues at block 604, else the component continues at block 606. In block 604, the component again invokes the re-create component passing an indication of the target address and, this time, an indication to attempt to re-create using the column check unit of the data word. In decision block 605, if an error is returned, then the component is unable to re-create the data word, else the component continues at block 606. In block 606, the component stores the re-created value in the target register and then returns from the load instruction by passing control to the next instruction of the application program.

Figure 7:
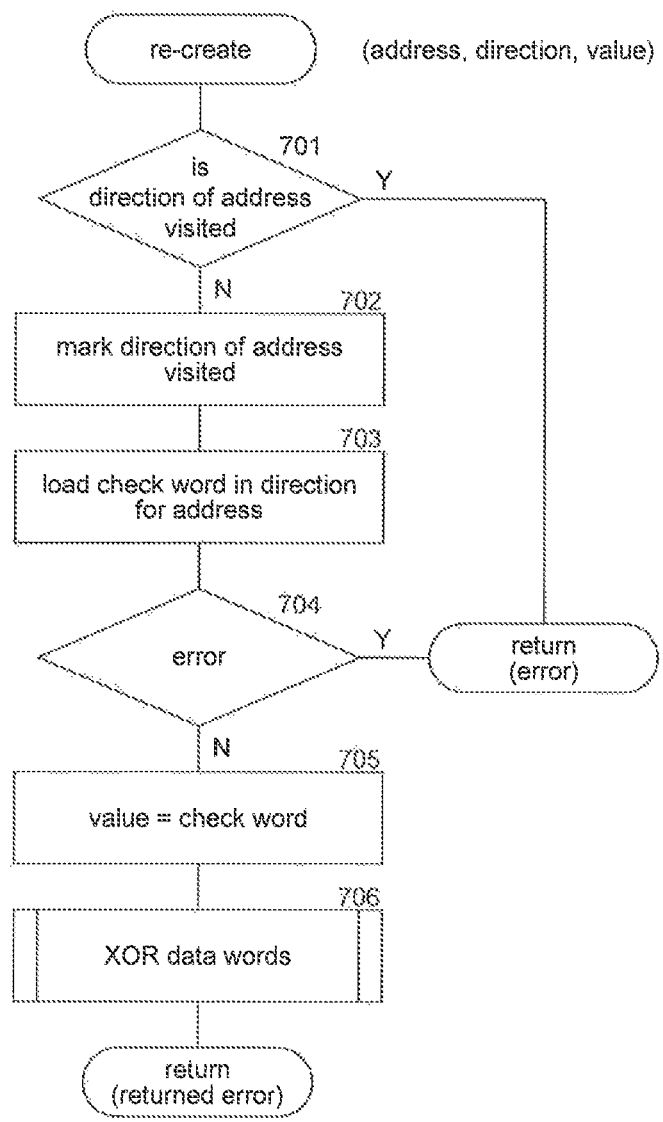
FIG. 7 is a flow diagram that illustrates the processing of the re-create component of the resiliency system in some embodiments.

FIG. 7 is a flow diagram that illustrates the processing of the re-create component of the resiliency system in some embodiments. The re-create component is passed an address and a check unit direction and returns a re-created data word for that address. The component is recursively invoked when memory errors are detected when attempting to re-create. In decision block 701, if the check unit for the passed address in the passed direction is marked as visited, then the data word for the passed address cannot be re-created using that check unit and the component returns an error, else the component continues at block 702. In block 702, the component marks the check unit of the passed address in the passed direction as visited to indicate that this check unit has already been processed. In block 703, the component loads the check word in the check unit of the passed direction for the passed address. In decision block 704, if a memory error was detected in loading the check word, then the component returns an error, else the component continues at block 705. In block 705, the component sets the initial value for the re-created data word to the check word. In block 706, the component invokes an XOR data word component to complete the re-creation of the data word by XORing in the other data words of the check unit into the initial value. The component then returns an error status provided by the XOR data word component.

Figure 8:
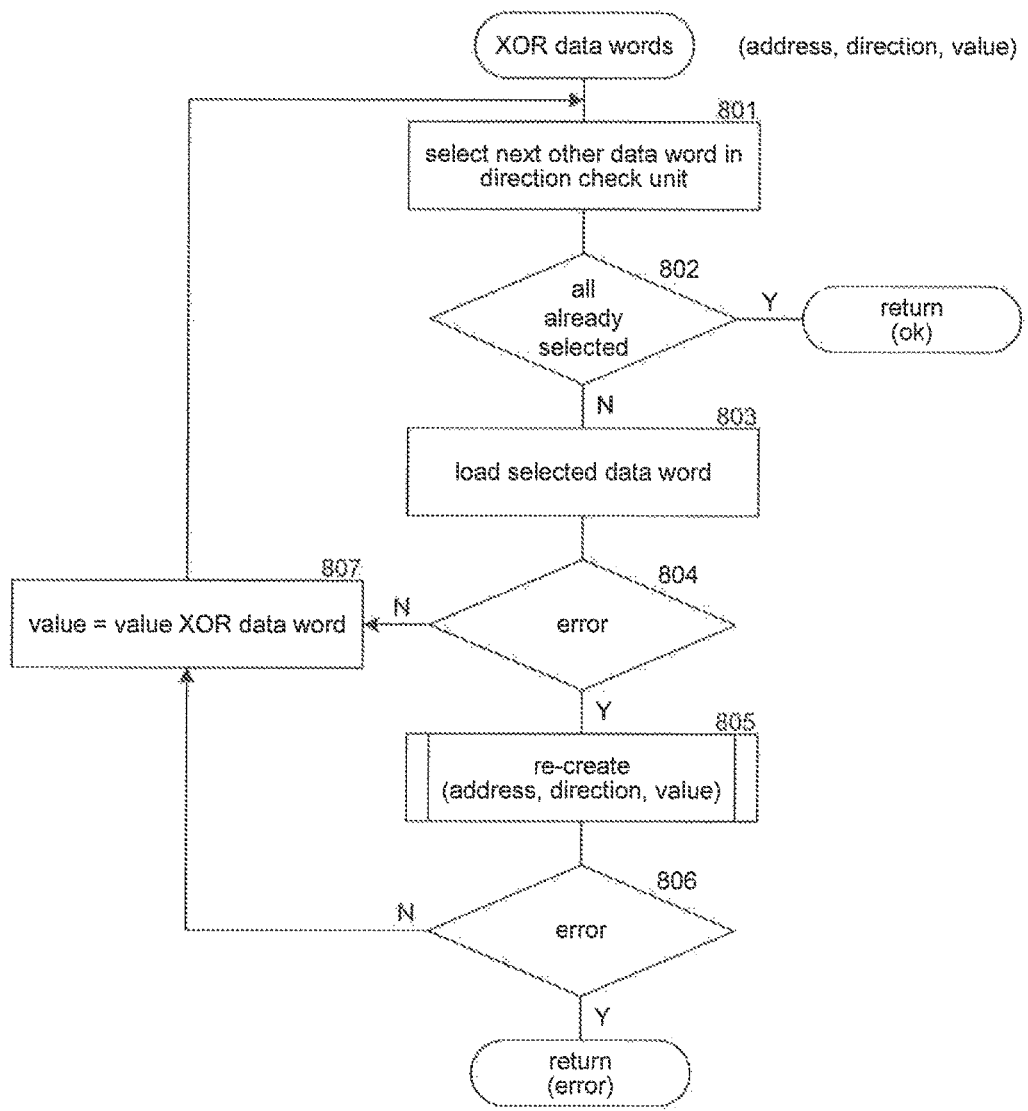
FIG. 8 is a flow diagram that illustrates the processing of the XOR data words component of the resiliency system in some embodiments.

FIG. 8 is a flow diagram that illustrates the processing of the XOR data words component of the resiliency system in some embodiments. The component is passed an indication of an address, a direction, and a value and XORs the other data words of the check unit of the passed address in the passed direction. In blocks 801-807, the component loops XORing each of the other data words of the check unit with the passed value. In block 801, the component selects the next other data word of the check unit. In decision block 802, if all the other data words have already been selected, then the component returns an indication that the data word for the passed address has been successfully re-created, else the component continues at block 803. In block 803, the component loads the selected data word. In decision block 804, if a memory error occurs during the load, then the component continues at block 805, else the component continues at block 807. In block 805, the component recursively invokes the re-create component to re-create the selected data word. In decision block 806, if an error was returned in attempting to re-create the selected data word, then the component returns an error, else the component continues at block 807. In block 807, the component XORs the value with the selected data word and loops to block 801 to select the next other data word.

Figure 9:
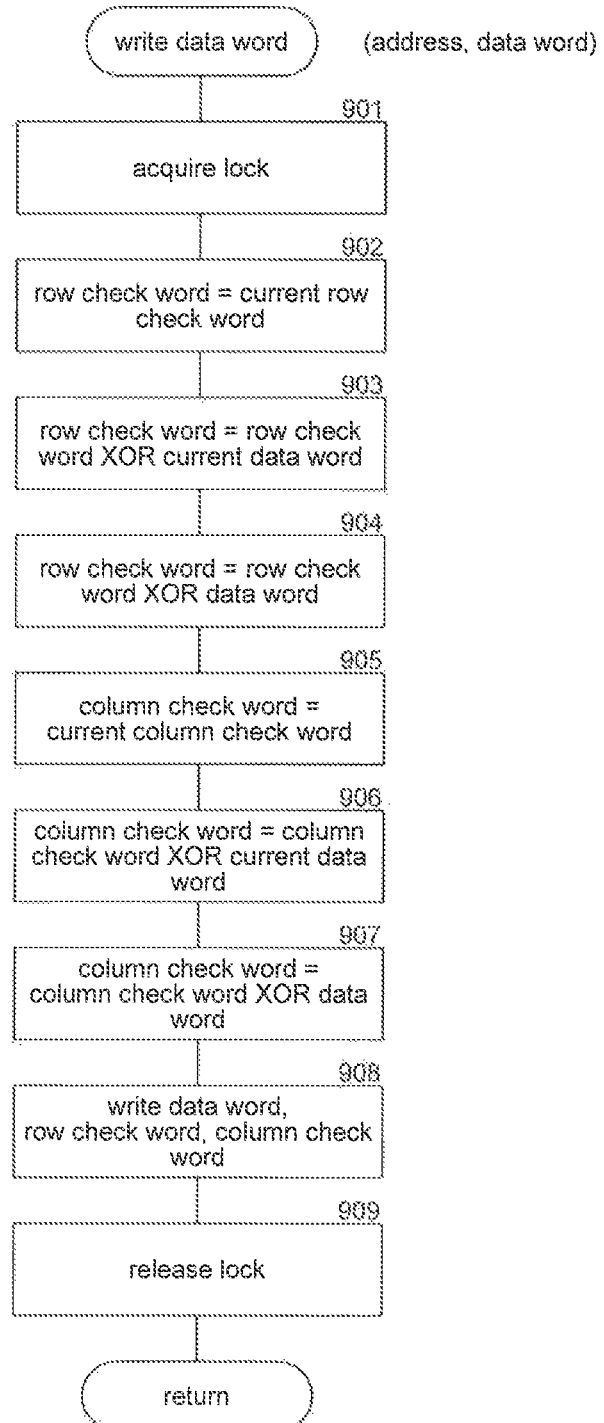
FIG. 9 is a flow diagram that illustrates the processing of the write data word component of the resiliency system in some embodiments.

FIG. 9 is a flow diagram that illustrates the processing of the write data word component of the resiliency system in some embodiments. The component is passed an address and a data word to store in the address. In block 901, the component acquires a lock covering the check group for the passed address. In block 902, the component initializes a row check word to the current row check word loaded from memory. In block 903, the component XORs the current data word loaded from memory into the row check word. In block 904, the component XORs the passed data word into the row check word. In blocks 905-907, the component generates the column check word for the passed address in a manner analogous to the generating of the row check word. In block 908, the component stores the passed data word, the row check word, and the column check word. In block 909, the component releases the lock and then returns. If, during execution of the write data word component, a memory error is detected when loading from the resilient segment, then control may be passed to the memory error handler to re-create the data word for the load instruction. For example, a memory error may occur when loading a check word or the current data word.

Figure 10:
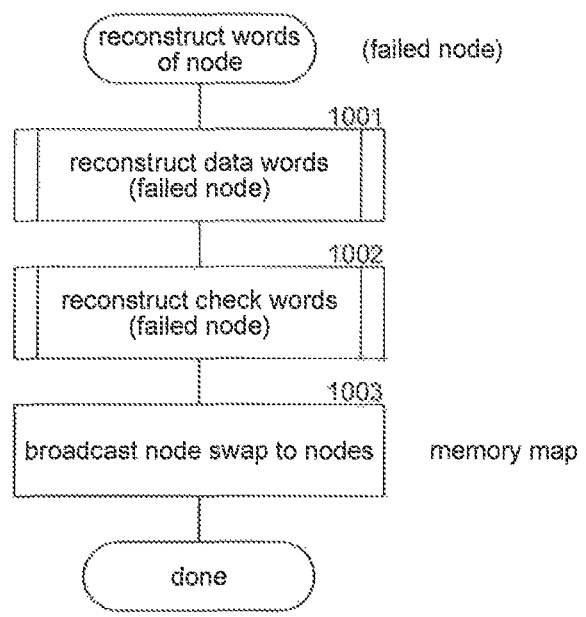
FIG. 10 is a flow diagram that illustrates the processing of a reconstruct words of a node component of the resiliency system in some embodiments.

FIG. 10 is a flow diagram that illustrates the processing of a reconstruct words of a node component of the resiliency system in some embodiments. The component, executing at a replacement or backup node, is passed an indication of a failed node and reconstructs the data words and check words of that failed node. In block 1001, the component invokes a reconstruct data words component passing an indication of the failed node. In block 1002, the component invokes the reconstruct check words component passing an indication of the failed node. In block 1003, the component broadcasts a message to the other nodes to indicate that the failed node has been replaced and then completes.

Figure 11:
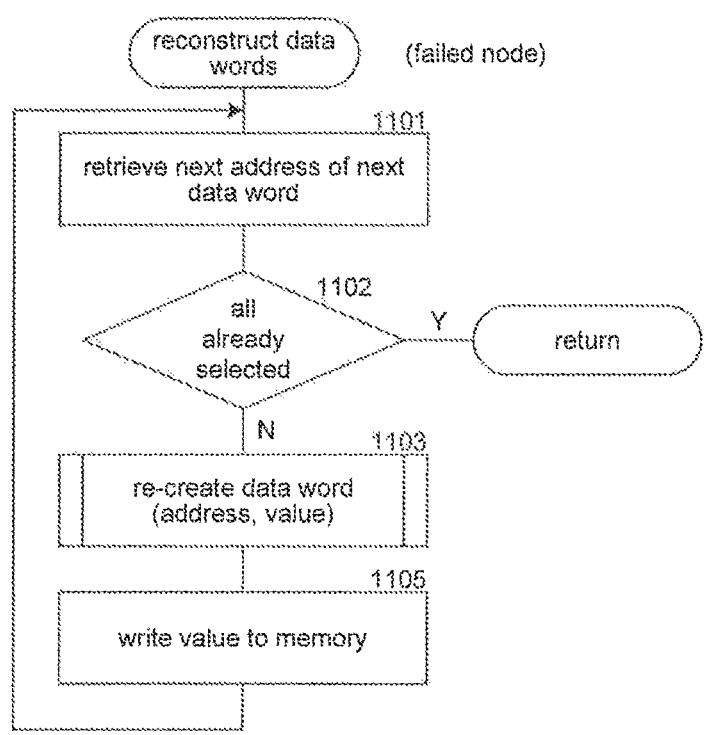
FIG. 11 is a flow diagram that illustrates the processing of the reconstruct data words component of the resiliency system in some embodiments.

FIG. 11 is a flow diagram that illustrates the processing of the reconstruct data words component of the resiliency system in some embodiments. The component is passed an indication of the failed node and reconstructs the data words of that failed node. In block 1101, the component retrieves the address of the next data word of the failed node. In decision block 1102, if all the data words have already been selected, then the component returns, &se the component continues at block 1103. In block 1103, the component invokes the re-create data words component passing an indication of the retrieved address and receiving a re-created value for that address in return. In block 1104, the component stores the value into the memory of the node replacing the failed node and then loops to block 1101 to select the next data word.

Figure 12:
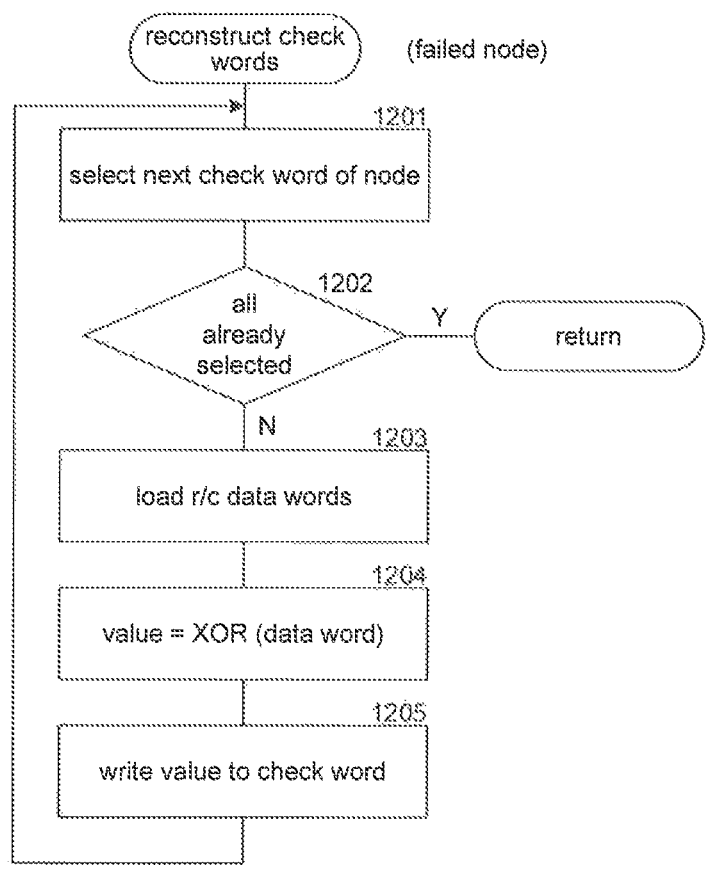
FIG. 12 is a flow diagram that illustrates the processing of the reconstruct check words component of the resiliency system in some embodiments.

FIG. 12 is a flow diagram that illustrates the processing of the reconstruct check words component of the resiliency system in some embodiments. The component is passed an indication of a failed node and reconstructs the check words of that failed node. In block 1201, the component selects the next check word of the failed node. In decision block 1202, if all the check words have already been selected, then the component returns, else the component continues at block 1203. In block 1203, the component loads the data words of the check unit for the selected check word. If a load fails, then the memory error handler may be used to re-create a data word using, for example, a column check unit when the failure occurs when reconstructing a row check word. In block 1204, the component generates the value for the check word by XORing in the loaded data words. In block 1205, the component stores the value in the check word, then loops to block 1201 to select the next check word.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. In some embodiments, application programs that were not developed to access resilient segments may be adapted to access resilient segments. For example, when compiling such an application program, the compiler may input information identifying a data structure that is to be made resilient. The compiler may then insert initialization code to register that data structure to be a resilient segment and generate calls to the write or store function of the resiliency system instead of native store instructions to that data structure. The compiler may employ compiler directives informing the compiler which data structures of an application program are to be resilient segments. Alternatively, prior to compilation, source code of the application program may be automatically adapted to employ resilient segments using a compiler pre-processor program. After compilation, object code (or other lower-level code) of the application program may be automatically adapted to employ resilient segments using a compiler post-processor program. Accordingly, the invention is not limited except as by the appended claims.

We claim:

1. A method in a computing system for storing data words of a segment of memory and check words to support resiliency of memory of a memory system of the computing system, the memory system providing a cache line of data words per access and a non-specific memory error signal covering multiple data words of the cache line when the memory system cannot correct a memory error, the method comprising:
   receiving from an application program a request to register the segment; and
   in response to receiving the request, for each of a plurality of check units of the segment,
      loading data words of that check unit wherein none of the data words of that check unit are covered by the same non-specific memory error signal;
      generating a check word for that check unit; and
      storing the generated check word in association with that check unit.

2. The method of claim 1 wherein the non-specific memory error signal covers the entire cache line.

3. The method of claim 1 wherein the non-specific memory error signal covers half of the cache line.

4. The method of claim 1 further comprising:
   upon receiving a generated non-specific memory error signal that is generated when loading a data word of a check unit,
      loading the other data words of that check unit and the check word; and
      re-creating the data word from the loaded other data words and the check word.

5. The method of claim 1 further comprising generating a check word address for that check unit such that the check word address can be regenerated from each of the addresses of the data words of that check unit and cannot be regenerated from any other addresses of data words.

6. The method of claim 1 wherein the check units form a two-dimensional check group.

7. The method of claim 1 further comprising, when an application program is to store a data word within a check unit, regenerating the check word for that check unit and storing the regenerated check word in association with the check unit.

8. A computing system for storing data words of a segment of memory and storing check words to support memory resiliency, the computing system comprising:
   a memory system with the memory storing the data words of the segment and storing computer-executable instructions, the memory system providing a cache line of data words per access and providing a non-specific memory error signal covering multiple data words of the cache line when the memory system cannot correct a memory error, the computer-executable instructions for controlling the computing system to, in response to receiving a request from an application program to register the segment to be resilient:
      load data words of a check unit of the segment wherein none of the data words of the check unit are covered by the same non-specific memory error signal;
      generate a check word for the check unit; and
      store the generated check word in association with the check unit; and
   a processor for executing the computer-executable instructions stored in the memory.

9. The computing system of claim 8 wherein the computer-executable instructions further control the computing system to, upon receiving a generated non-specific memory error signal that is generated when loading a first data word of a check unit,
   load the other data words of that check unit that are other than the first data word and the check word associated with that check unit; and
   re-create the first data word from the loaded other data words and the check word.

10. The computing system of claim 8 wherein the check unit is within a two-dimensional check group of check units and the load of the data words of the check unit is for a first dimension of the check group and wherein the computer-executable instructions further control the computing system to, upon receiving a generated non-specific memory error signal that is generated when loading another data word of the check unit for the first dimension,
   load data words of a check unit for a second dimension that includes the other data word wherein none of the data words of that check unit are covered by the same non-specific memory error signal; and
   re-create the other data word based on the loaded data words of the check unit for the second dimension and a check word associated with that check unit.

11. The computing system of claim 8 wherein the computer-executable instructions further control the computing system to generate a check word address for that check unit such that the check word address can be regenerated from each of the addresses of the data words of that check unit and cannot be regenerated from any other addresses of data words.

12. The computing system of claim 8 wherein the computer-executable instructions further control the computing system to, when an application program is to store a data word within a check unit, regenerate the check word for that check unit and store the regenerated check word in association with the check unit.

13. A non-transitory computer-readable storage medium storing computer-executable instructions for controlling a computing system with a memory system having memory, the memory system providing a cache line of data words per load and a non-specific memory error signal covering multiple data words of the cache line when a memory error when loading a cache line of data words cannot be corrected by the memory system, the computer-executable instructions for controlling the computing system to perform acts comprising, in response to receiving a request to register a segment of the memory to be resilient:

load data words of a check unit of the segment from the memory, wherein none of the data words of that check unit are covered by the same non-specific memory error signal provided by the memory system;

generate a check word for that check unit; and store the generated check word in association with the check unit.

14. The non-transitory computer-readable storage medium of claim 13 wherein the computer-executable instructions further control the computing system to:

upon receiving a non-specific memory error signal when loading a data word of the check unit, load the other data words of the check unit and the check word; and re-create the data word from the loaded other data words and the check word.

15. The non-transitory computer-readable storage medium of claim 13 wherein the computer-executable instructions further control the computing system to generate a check word address for the check unit such that the check word address can be regenerated from each of the addresses of the data words of the check unit and cannot be regenerated from other addresses of data words and store check word at the check word address.

16. The non-transitory computer-readable storage medium of claim 13 wherein the computer-executable instructions further control the computing system to, when an application program is to store a data word within a check unit, regenerate the check word for that check unit and store the regenerated check word in association with the check unit.

17. The non-transitory computer-readable storage medium of claim 13 wherein the non-specific memory error signal covers the entire cache line.

* * * * *